US Patent [19] Thiel

[11] Patent Number: 4,586,427
[45] Date of Patent: May 6, 1986

[54] VACUUM BRAKE BOOSTER

[75] Inventor: Rudolf Thiel, Frankfurt am Main, Fed. Rep. of Germany

[73] Assignee: ITT Industries, Inc., New York, N.Y.

[21] Appl. No.: 601,125

[22] Filed: Apr. 19, 1984

Related U.S. Application Data

[63] Continuation of Ser. No. 395,874, Jul. 7, 1982, abandoned, which is a continuation of Ser. No. 143,382, Apr. 24, 1980, abandoned.

[30] Foreign Application Priority Data

May 10, 1979 [DE] Fed. Rep. of Germany ....... 2918907

[51] Int. Cl.[4] ............................................. F15B 9/10
[52] U.S. Cl. ..................... 91/369 A; 92/99; 92/128; 92/169
[58] Field of Search ............... 91/369 A, 376 R; 92/98 D, 99, 128, 169.2

[56] References Cited

U.S. PATENT DOCUMENTS

| 3,096,689 | 7/1963 | Kytta | 91/369 A |
|---|---|---|---|
| 3,143,927 | 8/1964 | French | 91/369 A |
| 3,289,547 | 12/1966 | Kytta | 91/369 A |
| 3,517,588 | 6/1970 | Kytta | 91/369 A |
| 3,688,647 | 9/1972 | Kytta | 91/376 R |
| 4,005,639 | 1/1977 | Welsh | 91/376 R |
| 4,257,312 | 3/1981 | Ohmi | 91/376 R |
| 4,270,353 | 6/1981 | Thomas | 92/98 D |
| 4,271,670 | 6/1981 | Ohmi | 91/369 A |
| 4,279,193 | 7/1981 | Satoh | 91/376 R |
| 4,286,501 | 9/1981 | Thomas | 91/376 R |

FOREIGN PATENT DOCUMENTS

| 666181 | 7/1963 | Canada ........................... 91/369 A |
|---|---|---|
| 2365903 | 11/1976 | Fed. Rep. of Germany . |
| 2118925 | 8/1972 | France . |

Primary Examiner—Abraham Hershkovitz
Attorney, Agent, or Firm—James B. Raden; Donald J. Breh

[57] ABSTRACT

In prior art vacuum brake boosters the partition wall is supported by a control hub. The boosting force is transmitted through the hub to a force transmitting serving to actuate the master cylinder. According to the present invention the partition wall includes a central sleeve of a stepped configuration which serves to transmit the boosting force without loading the hub. As a result the hub can be produced from a thermoplastic material of just sufficient strength to meet the reduced force transmitting requirements and which is easier to mold.

12 Claims, 2 Drawing Figures

VACUUM BRAKE BOOSTER

This application is a continuation of application Ser. No. 395,874, filed July 7, 1982, abandoned, which was a continuation of Ser. No. 143,382, filed on Apr. 24, 1980 abandoned.

BACKGROUND OF THE INVENTION

The present invention relates to vacuum brake booster for motor vehicles comprising a low pressure housing which is divided into a vacuum chamber and a working chamber by a movable rigid partition. The partition is connected to an axially movable control hub containing therein a valve arrangement with the control hub acting via a reaction device on a force transmitting element.

From French Pat. No. 2,118,925 a vacuum brake booster has become known in which the movable partition is fixed on the control hub. The control hub in the vacuum chamber has a shoulder around the circumference thereof and the partition positively abuts the shoulder in the direction of power delivery. By a circlip which positively engages the control hub, the partition and a rubber diaphragm adjoining the partition is held at the shoulder of the control hub opposite the direction of power delivery. The depth of engagement of the circlip into the control hub is such that it engages a groove of the valve piston of the valve arrangement and, thus, limits the axial motion of that valve piston.

The force transmitting element is coaxial of the control hub and sealingly guided out of the vacuum chamber and is supported by the front surface of the control hub by means of a rubber-like reaction disc. The reaction disc lies opposite to the valve piston with a small clearance and, thus, can receive the vacuum forces transmitted by the partition onto the control hub and also that part of the foot or pedal forces which are produced by the piston bar mechanically connected to the valve piston.

In an arrangement of this type the control hub must be constructed in such a way that it can transmit the vacuum forces produced onto the force transmitting element without being damaged. For this purpose, on one hand, an expensive resistant material having a high resistance to pressure must be used for the production of the control hub, and, on the other hand, the element of the control hub having the shoulder in the vacuum chamber must be made from such a strong material that the air channels arranged in the control hub do not create any critical weak areas regarding stress.

From German Pat. No. DE-AS 2,365,903 another vacuum brake booster is known in which the partition itself is constructed as the reaction device which adds up the vacuum forces and the foot forces and transmits them to the force transmitting element.

The force transmitting element is a stepped piston bar whose smaller diameter portion is guided in a bore of the valve piston of the valve arrangement.

The valve piston carries a circlip which comes into engagement with the end of the control hub facing the vacuum chamber and which axially secures the piston opposite the power direction. The partition is radially segmented, is supported by the valve piston and acts on the force transmitting element via a supporting plate which is slightly arched. The supporting plate abuts the step of the smaller portion of the force transmitting element in a form-locking manner and is kept in a defined position relative to the control hub and to the partition by spacers projecting through the partition. The supporting plate abuts the partition only by means of its outer circumference. By the rubber diaphragm which is buttoned onto a shoulder of the control hub and is fixed in the wall of the low pressure housing, the partition of the working chamber and vacuum chamber is effected. With operation of a pedal mechanically connected to the valve piston, the vacuum forces acting on the partition will act on the force transmitting element via the supporting plate. As a result the partition will conically deform and move the valve piston against the force of the pedal axially opposite to the power direction in order to transmit a reaction force relative to the output force onto the pedal.

In this brake booster the control hub is relieved to a large extent of the operating forces, since the partition is constructed as the reaction device. However, construction of the brake booster is complex due to the many components necessary.

SUMMARY OF THE INVENTION

Therefore, an object of the present invention is to provide a vacuum brake booster which has a simple construction, keeps the control hub free of the forces, which due to the produced pressure difference, act on the partition, allows a simple and, consequently, an advantageous assembly regarding costs and can transmit the operating force onto the force transmitting element without loading the control hub.

A feature of the present invention is the provision of a vacuum brake booster comprising: a housing having a longitudinal axis; a movable rigid partition wall disposed in the housing coaxial of the axis to divide the housing into a working chamber and a vacuum chamber; a control hub containing a valve arrangement therein disposed in the housing coaxial of the axis, the control hub being axially movable in the housing and acts via a reaction device on a force transmitting element; and a sleeve disposed in the housing coaxial of the axis connected to the control hub and the partition wall and supported by the force transmitting element.

Thus, it is possible to produce the control hub of an inexpensive material which must meet only very negligible requirements. Since the sleeve is made of a compression-proof material capable of loading, the use of expensive material of high quality is reduced to a minimum.

Since the sleeve is made of a metal, stops can be attached by cold deformation so that all elements which are interlocking can be axially secured. When the control hub is made of a synthetic material which can be sprayed, e.g. thermoplast, the production of the control hub can employ cheaper materials and a shorter production period can be achieved.

Apart from that, when the control hub is produced of a thermoplastic material all undercuts and locking profiles can be integrally molded and into these undercuts supporting discs can be pressed to increase stability and precision of form. Furthermore, a saving of weight can be achieved through an appropriate choice of material.

If the sleeve and the partition form one constructional unit, it would be possible to stamp the sleeve out of the middle of the partition. The control hub could then be attached by gluing or shrinkage.

When the control hub of a vacuum brake booster contains a valve arrangement including a poppet valve and valve piston to be operated by a piston rod, the valve piston can be conveniently sealed in the sleeve. All radial forces produced by the piston rod are directly transmitted onto the sleeve and do not act on the control hub.

When the sleeve is of a stepped construction the valve piston slides in the portion thereof having a smaller diameter and the force transmitting element is guided in the portion thereof having a larger diameter. The end of the force transmitting element adjacent the sleeve bears against the reaction unit disposed in the larger diameter portion of the sleeve which in turn is supported by the step formed between the two portions of the sleeve. This construction enables the piston rod and the valve piston to be aligned exactly coaxially with the force transmitting element.

The valve piston is axially secured by a stop disposed in the portion of the sleeve having the smaller diameter. At the same time it is possible to dimension precisely the idle path of the vacuum brake booster by means of a precise, axial arrangement of the stop, which is made only during the assembly and does not require any additional elements. Owing to the fact that the sealing diaphragm is axially arranged between the partition and the control hub which are positively clamped together by the inserted sleeve, fastening of the diaphragm is easy and the diaphragm also acts as a seal between control hub and partition.

For air circulation, the connection between the vacuum chamber and valve arrangement in the control hub is achieved by a bore disposed in the surface of the partition adjoining the control hub.

The assembly of the arrangement is simplified by constructing the radial opening for air circulation in a plane axially arranged at the valve piston so that an implement can be run in for placing the stops. One assembly step as well as additional elements can be saved.

By constructing hub and sleeve in such a way that a projection of the control hub positively engages a groove of the sleeve or a projection of the sleeve positively engages a groove of the control hub, a firm seat for the sleeve is guaranteed without any additional means. By gluing the sleeve into the control hub, a fixed coherence is also guaranteed. Furthermore, by modern welding processes, such as ultrasonic welding, the sleeve can be tightly fixed in the control hub against atmospheric pressure.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
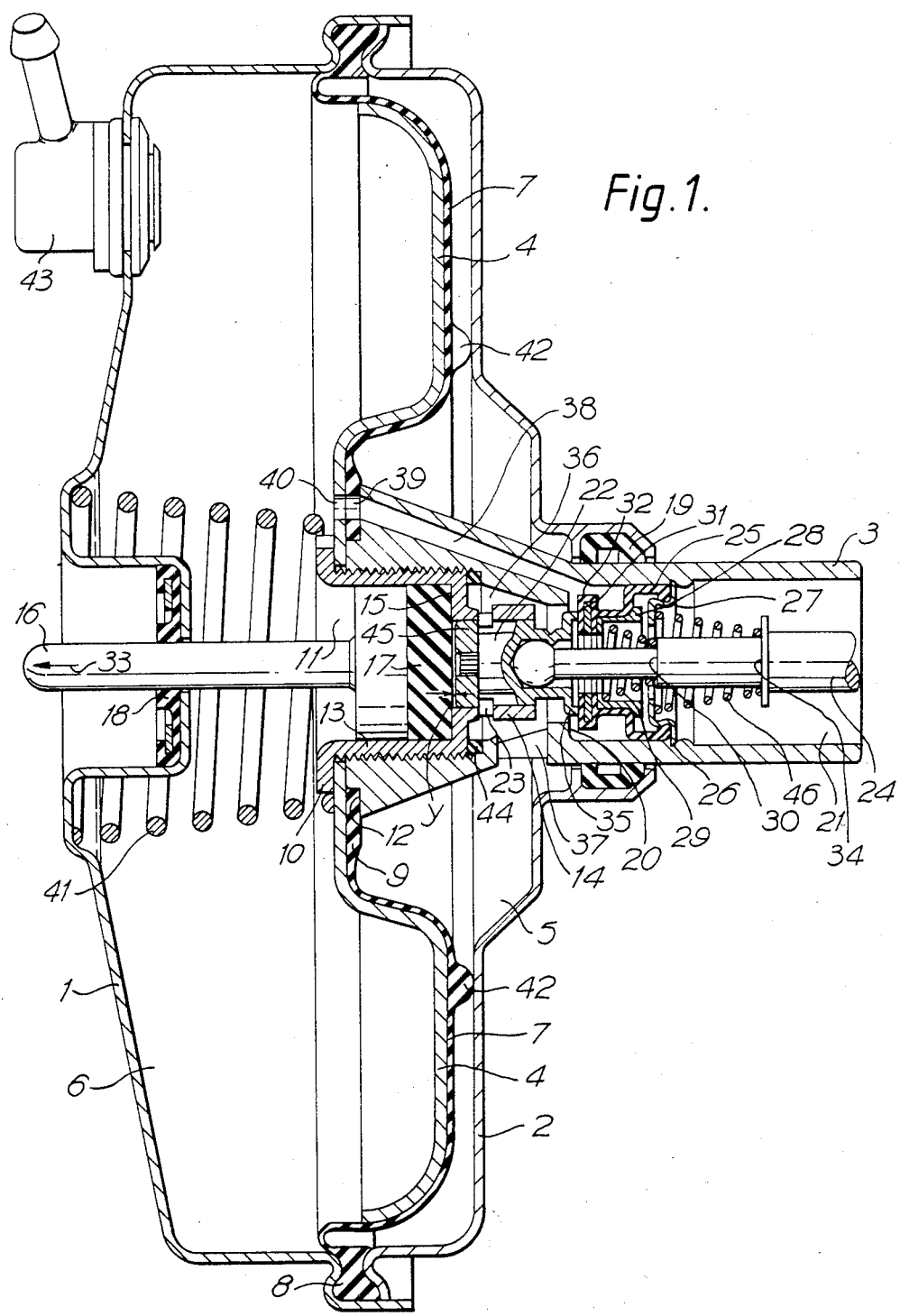
FIG. 1 is a longitudinal cross-sectional view of one embodiment of a vacuum brake booster in accordance with the principles of the present invention having a screwed-in sleeve and a control hub made of inelastic material, e.g. duroplastic.

Referring to FIG. 1, the low pressure housing of the vacuum brake booster includes a pot 1 and a cover 2.

A partition 4 axially movable together with the control hub 3 divides the low pressure housing into a working chamber 5 and a vacuum chamber 6. A rubber diaphragm 7, the outer border 8 of which is sealingly clamped between pot 1 and cover 2 of the low pressure housing and the internal border 9 of which is sealingly clamped in control hub 3, abuts partition 4 on the side of partition 4 facing working chamber 5 and, thus, seals vacuum chamber 6 from working chamber 5. Partition 4 is positively held at the front end of control hub 3 facing away from the direction of force 33 by the flange 10 of a sleeve 11 screwed into control hub 3. Thereby partition 4 firmly presses internal border 9 of rubber diaphragm against control hub 3. Internal border 9 lies in a circular groove 12 arranged on the front end of control hub 3 opening toward the power delivery direction 33. Inserted sleeve 11 is a stepped sleeve whose smaller diameter portion 14 projects into the interior of control hub 3. The force transmitting element 16 is guided in the larger diameter portion 13 of sleeve 11. Element 16 is supported by step 15 between portions 13 and 14 of sleeve 11 via a reaction disc 17. Force transmitting element 16 extends through the bottom of pot 1 to the outside and is sealed thereto by a seal 18 frictionally held in a stepped portion in the bottom of pot 1. On the other side of the housing, control hub 3 projects through cover 2 and is axially opened to the atmosphere. By means of a seal 19 locked in cover 2, working chamber 5 is sealed against the atmosphere.

The interior of control hub 3 is hollow and essentially has only one step 20 between the smaller and larger diameter portions of the air chamber 21 which is open to the atmosphere. Step 20 serves as a sealing edge for the valve arrangement inserted into air chamber 21 which is present on the right and on the left of step 20. On the left of step 20 the valve piston 22 is arranged in section 14 of sleeve 11 having projections 23 which limit the axial movement of valve piston 22. Valve piston 22 is moveable and is clamped onto the wall ball head of a stepped piston rod 24 without any axial clearance. Piston rod 24 projects through air chamber 21 and is connected to an operating pedal (not shown). A disc valve 25 is inserted into air chamber 21 to the right of step 20 and piston rod 24 projects through valve 25 with clearance.

By a step 26, disc 27, having a cross-section in the form of a z and having an axial aperture, is kept in its position in control hub 3 and is sealingly pressed against the interior wall of air chamber 21. Within disc valve 25, a sleeve 28 is inserted which is pressed against valve disc 32 stiffened by an insert 31 by a spring 29 supporting a first step 30 of piston rod 24. Piston rod 24 has a force applied thereto opposite to the direction of force 33 by another spring 46 acting between another step 34 of piston rod 24 and disc 27 so that valve piston 22 mechanically connected to piston rod 24 comes into sealed engagement with valve disc 32 by means of its bead-shaped outer border 35 and, thus, separates air chamber 21 from the interior of the booster including a chamber 36. This separated chamber 36 is to the left of step 20 and via two openings 37 disposed in control hub 3 is connected to working chamber 5. Chamber 36 is also connected to the right of step 20 to vacuum chamber 6 via two channels 38 in control hub 3 disposed radially outside and above step 20, two openings 39 in rubber diaphragm 7 and two bores 40 in partition 4.

The rest position of the vacuum brake booster shown in FIG. 1 is determined by the spring 41 which shifts partition 4 opposite to the power delivery direction until the knub 42 of rubber diaphragm 7 abuts cover 2 of the low pressure housing. In the rest position of the pedal the air supply to working chamber 5 is blocked by valve piston 22 coming into engagement with valve disc 32. Consequently, there is a vacuum in working chamber 5, since it is, as shown in the drawing, connected to vacuum chamber 6 via openings 37, chamber 36, step 20, channels 38 and bores 39 and 40. Vacuum chamber 6 is connected to a continuously working vacuum source (not shown) via the connection 43.

In this embodiment control hub 3 is made of a duroplastic or metal or the like, so that sleeve 11 may be equipped with a thread and can be screwed into control hub 3. During the assembly of the vacuum brake booster the valve arrangement is slipped on piston rod 24 and then valve piston 22 is clamped on the ball head of piston rod 24. Control hub 3 is prepared to the extent that sleeve 11 is screwed into control hub 3 and sealed thereto by seal 44 inserted into control hub 3 and rubber diaphragm 7 is clamped between partition 4 and control hub 3. Now the prepared piston rod 24 is inserted into control hub 3 such that the valve head lies axially moveable in portion 14 of sleeve 11. Piston rod 24 is shifted into portion 14 of sleeve 11 until valve piston 22 butts against projections 23 in order to rivet a disc 45 having a diameter corresponding to the diameter of portion 14 of sleeve 11 at the free end of valve piston 22. Thereby the axial movement of piston rod 24 in control hub 3 is limited. In the rest position of the vacuum brake booster shown in the drawing, the distance Y between disc 45 and reaction disc 17 represents the idle path of the booster.

When the brake pedal is operated and hence piston rod 24 and valve piston 22 are shifted to the left when viewing FIG. 1, the disc valve 25 will follow this movement until valve disc 32 abuts on step 20. Then channels 38 are separated from chamber 36 and vacuum chamber 6 and working chamber 5 are no longer connected. The vacuum brake booster is in the position of readiness for operation.

When the brake pedal is further pressed down part of the force is transferred directly onto force transmitting element 16 via reaction disc 17. At the same time the bead-shaped outer border 35 of valve piston 22 will lift off of valve disc 32 and will connect chamber 36 to air chamber 21 and, consequently, to the atmosphere. Air enters working chamber 5 and the developing pressure difference between working chamber 5 and vacuum chamber 6 tries to shift partition 4 in the direction of force 33. However, all forces occurring are being directly transmitted from partition 4 via sleeve 11 onto force transmitting element 16. Control hub 3 remains completely free from these actuating forces.

Consequently, lower requirements, for instance, strength requirements, are possible in fabricating control hub 3. This results in advantages regarding manufacture as well as costs. Furthermore, a saving of weight can be achieved which meets the requirements of modern brake boosters.

Figure 2:
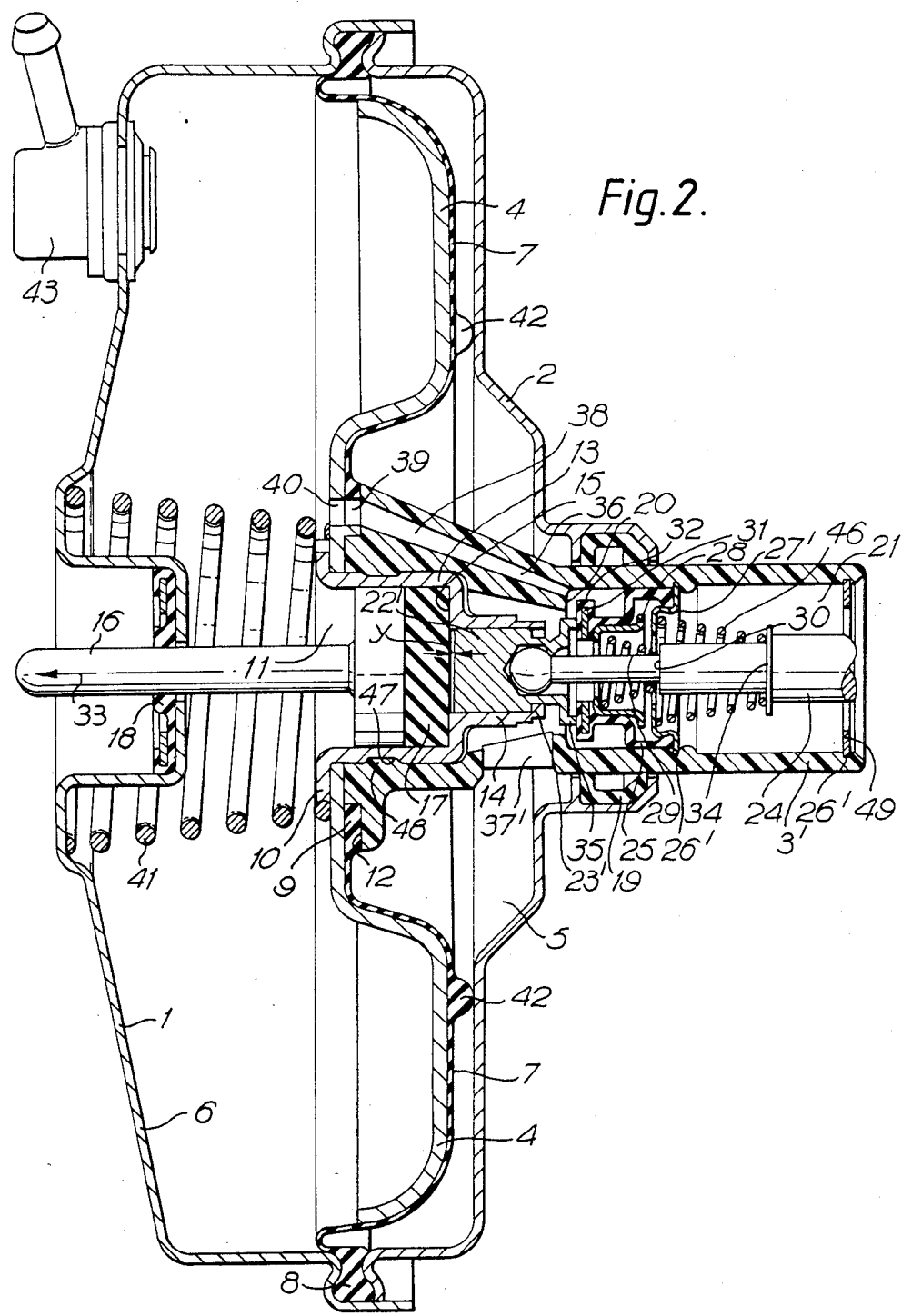
FIG. 2 is a longitudinal cross-sectional view of a second embodiment of a vacuum brake booster in accordance with the principles of the present invention having a control hub made of elastic material, e.g. thermoplast, and enlarged openings for bringing in the stops for the valve piston during the assembly.

An embodiment of this type is shown in FIG. 2. Since the construction only slightly differs from the one in FIG. 1 identical parts are provided with identical reference characters and changed parts are provided with the reference characters employed in FIG. 1 marked with a apostrophe. The essential difference is to be found in the construction of sleeve 11', in the fastening of sleeve 11' in control hub 3' and in the execution and limitation of the axial play of valve piston 22'.

The control hub 3' e.g. is moulded of thermoplast, wherein openings 37' to working chamber 5 were intentionally chosen large. Additional undercuts 26' are provided and a projection 48 is provided in the part receiving sleeve 11'. The advantages of this embodiment can best be explained by describing the steps of the assembly.

The valve arrangement is, as already described, slipped onto piston rod 24 and valve piston 22' is clamped thereon. During the following assembly step sleeve 11' is pressed into control hub 3'. Since control hub 3' is made from thermoplast capable of sealing, sealing ring 44 shown in FIG. 1 can be eliminated. There are several possibilities concerning the secure fastening of sleeve 11'. As shown in FIG. 2 groove 47 and projection 48 provides a positive engagement between sleeve 11' and control hub 3'. Alternatively, sleeve 11' and control hub 3' can be glued together. Additionally, it would be possible to provide this connection by shrinking control hub 3' onto sleeve 11' or to connect both of these construction units by means of modern welding processes, e.g. ultrasonic welding.

Now piston rod 24 with the valve arrangement already preassembled is inserted into control hub 3', wherein valve piston 22' is placed in portion 14 of sleeve 11' and the z-shaped, rigid disc 27' is pressed into an undercut 26' for form stabilization of control hub 3' and holding of the valve arrangement. Further, form-stabilizing discs 49 can be pressed into other undercuts 26'.

Now the assembler can insert an implement through openings 37' and following the adjustment to the necessary or allowed idle path y to produce stop 23', which engages the groove of valve piston 22' and limits the axial shifting path of valve piston 22' in sleeve 11'.

Compared to the embodiment in FIG. 1 one assembly step can be saved and sealing ring 44 as well as disc 45 fastened on valve piston 22 are eliminated. It is obvious that the mechanical elements which would be necessary for producing a stop prohibiting an extraction of valve piston 22 out of its guide in sleeve 11 (locking elements, clamp rings, discs) can be omitted and one assembly step (riveting of the disc) is saved.

This invention also comprises brake boosters which are operated by compressed air or pressure fluid as well as brake boosters for actuation of other aggregates, e.g. clutches.

While I have described above the principles of my invention in connection with specific apparatus it is to be clearly understood that this description is made only by way of example and not as a limitation to the scope of my invention as set forth in the objects thereof and in the accompanying claims.

I claim:
1. A vacuum brake booster comprising:
   a housing having a longitudinal axis;
   a movable rigid partition wall disposed in said housing coaxial of said axis to divide said housing into a working chamber and a vacuum chamber, said partition wall including a partition disposed in said vacuum chamber and a rubber diaphragm abutting said partition disposed in said working chamber;

a control hub containing a valve arrangement therein disposed in said housing coaxial of said axis, said control hub being axially movable in said housing and defining a bore therein coaxial of said axis opening into said vacuum chamber; and a discrete sleeve fastened in said bore of said control hub in sealed relation internally thereof, said sleeve having a generally radially inwardly directed step at one end and slidingly supporting a force transmitting element and a reaction device therein coaxial of said axis with said reaction device disposed adjacent said step, said sleeve having an outwardly extending flange extending from an opposite end thereof in said vacuum chamber, said flange being disposed to clamp an internal border of said partition wall between said flange and an end wall of said control hub with said flange disposed in said vacuum chamber in a sealed relationship with said partition wall and control hub such that movement of said partition acts on said sleeve and said force transmitting element via said reaction device whereby to substantially reduce forces acting on said control hub during operation of the brake booster.

2. A booster according to claim 1, wherein
said sleeve is made of a material resistant to compression and capable of being loaded with a force.

3. A booster according to claim 1, wherein
said sleeve is made of a metal.

4. A booster according to claim 1, wherein
said control hub is made of a plastic material capable of being sprayed selected from a group of plastic material consisting of a thermoplast and a duroplast.

5. A booster according to claim 1, wherein
said valve arrangement includes a disc valve and a valve piston operated by a piston rod, said valve piston being slideably guided in said sleeve.

6. A booster according to claim 5, wherein
said sleeve is a stepped sleeve having a smaller diameter portion, a larger diameter portion and a step therebetween, said valve piston being slideably guided in said smaller diameter portion, and said force transmitting element being slideably guided in said large diameter portion with the adjacent end of said force transmitting element abutting said step via a reaction element.

7. A booster according to claim 6, wherein
said smaller diameter portion includes therein a stop for said valve piston.

8. A booster according to claim 7, wherein
said valve arrangement further includes radial openings therein adjacent said valve piston, said radial openings being for air guiding and being sufficiently large to enable an implement to be inserted therethrough to provide said stop.

9. A booster according to claim 1, wherein
said partition wall includes a rigid wall member and a sealing diaphragm separating said working chamber and said vacuum chamber, said diaphragm being disposed between said rigid wall member and an adjacent end surface of said control hub and said sleeve positively holding said rigid wall member and said diaphragm against said adjacent end surface of said control hub.

10. A booster according to claim 9, wherein
said partition wall includes at least one bore therethrough adjoining said adjacent end surface of said control hub for air guiding.

11. A booster according to claim 1, wherein
one of said control hub and said sleeve have a projection thereon to engage a groove formed in the other of said control hub and said sleeve to connect said control hub and said sleeve together.

12. A booster according to claim 1, wherein
said sleeve is screwed into said control hub to form the connection therebetween.

* * * * *